United States Patent
Atsuumi et al.

(10) Patent No.: US 7,126,737 B2
(45) Date of Patent: Oct. 24, 2006

(54) OPTICAL SCANNING APPARATUS AND IMAGE FORMING APPARATUS

(75) Inventors: Hiromichi Atsuumi, Kanagawa (JP); Yukio Itami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/345,293

(22) Filed: Feb. 2, 2006

(65) Prior Publication Data

US 2006/0209377 A1    Sep. 21, 2006

(30) Foreign Application Priority Data

Mar. 17, 2005    (JP)    ............................. 2005-077573

(51) Int. Cl.
 *G02B 26/08*    (2006.01)
 *B41J 27/00*    (2006.01)
(52) U.S. Cl. ...................... 359/216; 359/204; 359/205; 347/243; 347/261
(58) Field of Classification Search ...................... None
 See application file for complete search history.

(56) References Cited

U.S. PATENT DOCUMENTS

| | | | | |
|---|---|---|---|---|
| 4,733,064 | A | * | 3/1988 | Ishikawa ................. 250/201.4 |
| 5,650,870 | A | * | 7/1997 | Kaino et al. ................. 359/216 |
| 2004/0169905 | A1 | | 9/2004 | Hayashi et al. |
| 2005/0018268 | A1 | | 1/2005 | Hayashi et al. |

FOREIGN PATENT DOCUMENTS

| | | |
|---|---|---|
| JP | 63-43172 | 2/1988 |
| JP | 9-58053 | 3/1997 |
| JP | 2746397 | 2/1998 |
| JP | 10-228148 | 8/1998 |
| JP | 2001-253113 | 9/2001 |
| JP | 2002-90672 | 3/2002 |
| JP | 2002-148551 | 5/2002 |
| JP | 2002-258189 | 9/2002 |
| JP | 2003-140070 | 5/2003 |
| JP | 2003-154703 | 5/2003 |
| JP | 3432054 | 5/2003 |
| JP | 2003-215484 | 7/2003 |
| JP | 2003-233094 | 8/2003 |

* cited by examiner

*Primary Examiner*—James Phan
(74) *Attorney, Agent, or Firm*—Oblon, Spivak, McClelland, Maier & Neustadt, P.C.

(57) ABSTRACT

An optical scanning apparatus includes a light source that emits a light beam, optical systems through which the light beam travels including one that forms a line image, a polygon mirror that rotates and deflects the light beam with a deflective reflection surface, and a scanning optical system that converges the light beam to scan a target surface with a light beam spot. The optical system closer to the light source than the polygon mirror is configured so as to correct a change in an image-forming position of the light beam spot caused by deformation of the deflective reflection surface originating from the rotation of the polygon mirror.

13 Claims, 2 Drawing Sheets

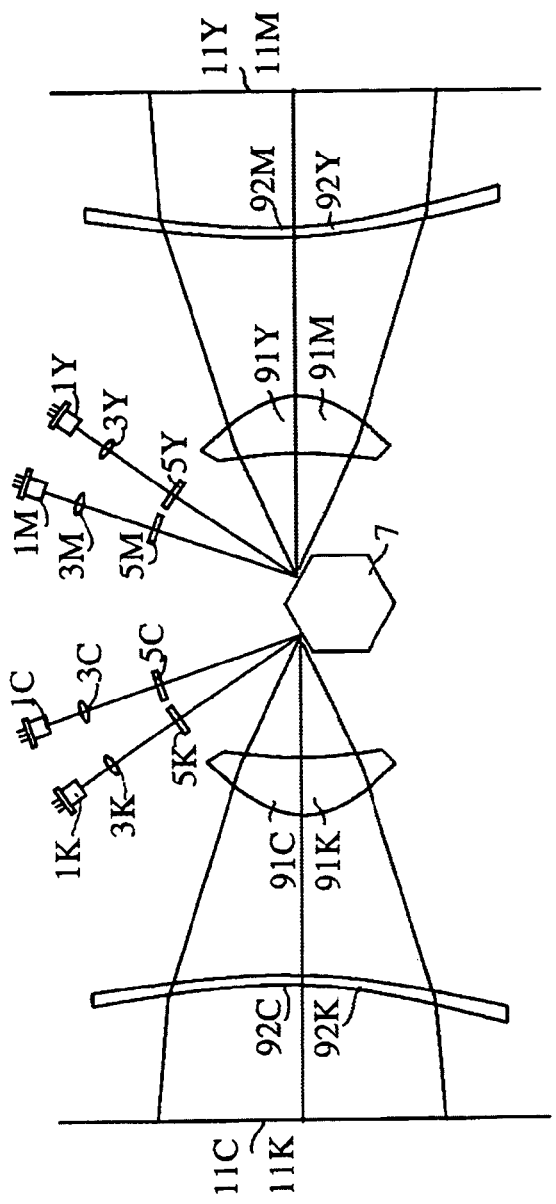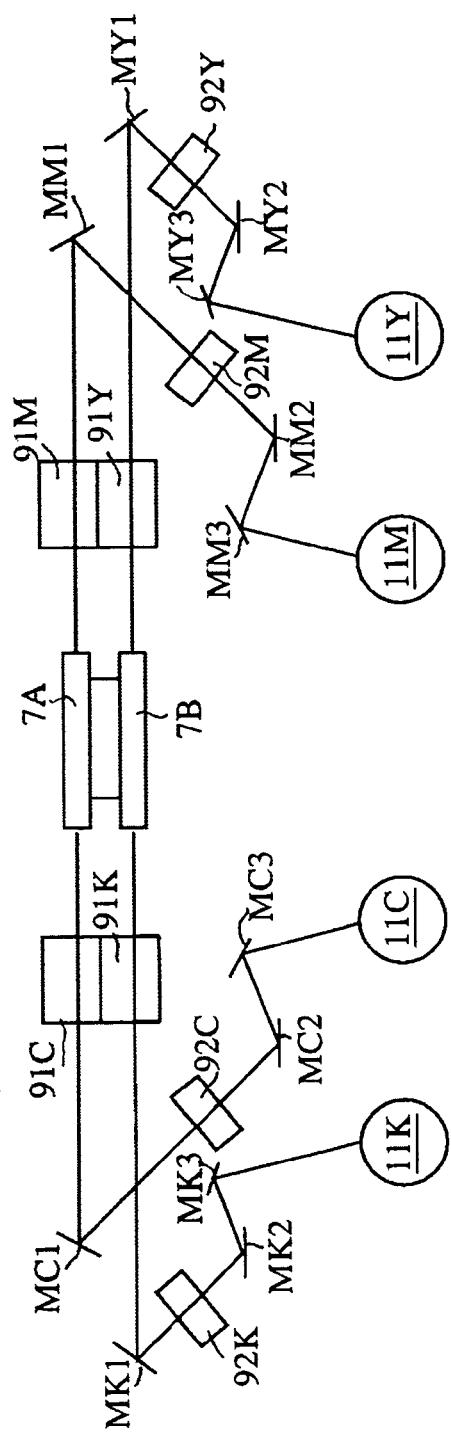
FIG.1A
FIG.1B

OPTICAL SCANNING APPARATUS AND IMAGE FORMING APPARATUS

CROSS-REFERENCE TO RELATED APPLICATIONS

The present document incorporates by reference the entire contents of Japanese priority document, 2005-077573 filed in Japan on Mar. 17, 2005.

BACKGROUND OF THE INVENTION

1. Field of the Invention

The present invention relates to an optical scanning apparatus and an image forming apparatus.

2. Description of the Related Art

Optical scanning apparatuses are used in image forming apparatuses, such as an optical printer, an optical plotter, an optical facsimile apparatus, and a digital copying machine.

With the progress of colorization of these image forming apparatuses, a so-called tandem type color image forming apparatus has become very popular to increase the image forming speed. The tandem type color image forming apparatus forms toner images of different colors respectively on a plurality of photoconductive surfaces, and sequentially transfers the toner images one on another on a sheet-like recording medium, thereby forming a color image. An example of such conventional technology is disclosed in Japanese Patent Application Laid-open No. 2002-90672.

Further, to achieve high-quality, high-definition images with the optical scanning apparatus, the spot size of a light beam spot is made smaller.

The spot size of a light beam spot on a surface to be scanned (hereinafter, referred to as scanning target surface) is determined by the design of the optical system that constitutes the optical scanning apparatus. Theoretically, a light beam spot is accurately formed on the scanning target surface, i.e., when the light beam waist position of a light beam that forms a light beam spot matches with an image surface. In practice, there are factors that shift the light beam waist position with respect to the scanning target surface.

One of such factors is deformation of the shape of the deflective reflection surface of a polygon mirror used as a light beam deflector, caused by the high-speed rotation of the polygon mirror. That is, the polygon mirror, which is generally formed of a light metal like aluminum, rotates fast at a very high speed of, for example, 20,000 rotations per minute (rpm). The high-speed rotation causes large centrifugal force to act on the polygon mirror, thus deforming the deflective reflection surface.

While the deflective reflection surface is normally flat, it is curved when deformed by the centrifugal force. In this case, in the optical system constituting the optical scanning apparatus, the deflective reflection surface itself will have an image forming action although small, thus changing the light beam waist position or the image-forming position of a deflected light beam. This enlarges a spot size such that the size of the light beam spot becomes greater than the designed size, thereby reducing the resolution of a formed image.

Methods of compensating for the influence of the deformation of the deflective reflection surface of a polygon mirror are proposed in the specifications of Japanese Patent Nos. 2746397 and No. 3432054.

The method disclosed in Japanese Patent No. 2746397 is based on the fact that a laser beam from a light source has a Gaussian intensity distribution on the cross section of the light beam, and reduces or prevents the enlargement of a spot size by adjusting the emission intensity of the light source. The method disclosed in Japanese Patent No. 3432054 designs the scanning optical system to cancel out a deviation of the light beam waist position caused by the deformation of the deflective reflection surface of the polygon mirror.

Japanese Patent No. 2746397 discloses a case in which the deflective reflection surface is deformed into a concaved surface, and Japanese Patent No. 3432054 discloses a case in which the deflective reflection surface is deformed into a convex surface.

The deformation of the deflective reflection surface according to the high-speed rotation of the polygon mirror, and the degree of the deformation actually depend on various factors, such as the number of rotations of the polygon mirror, the number of the deflective reflection surfaces, the shape of the deflective reflection surface, and the diameter of the rotational axis, and can fluctuate among polygon mirrors manufactured with the same design.

The method described in Japanese Patent No. 3432054 is effective when the amount of deformation of the deflective reflection surface is specifically known beforehand. However, in reality, the amount of deformation of the deflective reflection surface fluctuates according to various factors, and is not uniquely specified. When the scanning optical system is designed to eliminate the influence of the deformation of the deflective reflection surface, the design of the scanning optical system is changed every time a parameter like the number of rotations on the polygon mirror is changed.

The method described in Japanese Patent No. 2746397 requires an electrical unit that regulates the intensity of the laser beam source according to the deformation of the deflective reflection surface.

SUMMARY OF THE INVENTION

It is an object of the present invention to at least solve the problems in the conventional technology.

According to an aspect of the present invention, an optical scanning apparatus includes a light source that emits a light beam, a coupling optical system that receives the light beam from the light source and converts the light beam into a specific form, a line-image forming optical system that receives the light beam from the coupling optical system and forms a line image elongated in a main scanning direction, a polygon mirror that rotates, wherein the polygon mirror receives the light beam from the line-image forming optical system and deflects the light beam, the polygon mirror including a deflective reflection surface near an image-forming position at which the line image is formed, and a scanning optical system that receives the light beam from the polygon mirror and converges the light beam as a light beam spot onto a target surface to be scanned, and optically scans the target surface with the light beam spot, wherein at least one of the optical systems closer to the light source than the polygon mirror is configured so as to correct a change in an image-forming position of the light beam spot caused by deformation of the deflective reflection surface originating from the rotation of the polygon mirror.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWING

FIGS. 1A and 1B are explanatory diagrams of an optical scanning apparatus according to an embodiment of the present invention, and an image forming apparatus using the optical scanning apparatus;

DETAILED DESCRIPTION OF THE PREFERRED EMBODIMENT

Figure 2:
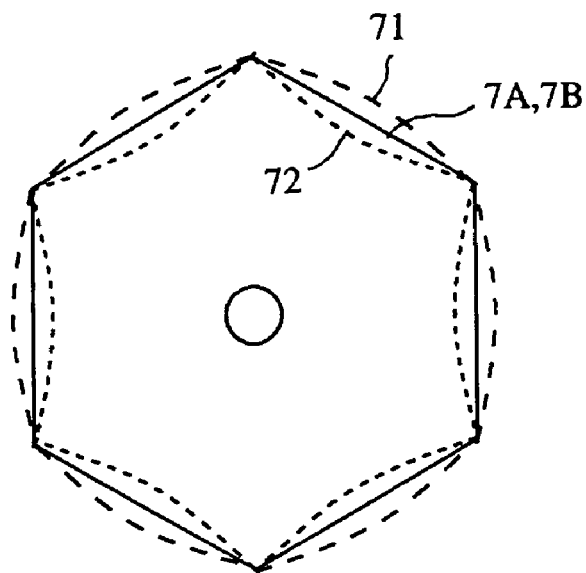
FIG. 2 depicts a polygon mirror of the embodiment shown in FIGS. 1A and 1B, as viewed from a rotation axis direction.

Exemplary embodiments of the present invention will be described below with reference to accompanying drawings. The present invention is not limited to these embodiments.

FIGS. 1A and 1B are explanatory diagrams of an optical scanning apparatus according to an embodiment of the present invention, and an image forming apparatus using the optical scanning apparatus. FIG. 1A is an explanatory diagram of the optical layout of the optical scanning apparatus. FIG. 1A is a top view of the optical layout as viewed from a rotation axis direction of the polygon mirror, and depicts an optical path extending from the polygon mirror in a linearly exploded view. FIG. 1B schematically depicts the configuration of the image forming apparatus as viewed from the rotation axis direction of a drum-like photoconductor. Optical system portions shown in FIG. 1B are equivalent to components laid out in an area at and following the polygon mirror.

The image forming apparatus shown in FIGS. 1A and 1B is a so-called tandem type color image forming apparatus. Images of magenta, yellow, cyan, and black components are respectively written on four photoconductors by optical scanning, and electrostatic latent images formed on the respective photoconductors are developed with a magenta toner, a yellow toner, a cyan toner, and a black toner so as to be visible as toner images. The color toner images are transferred, one on another onto the same recording sheet (transfer paper or the like), and are then fixed to form a color image.

Hereinafter, the colors that correspond to magenta, yellow, cyan, and black are designated with alphabetical letters M, Y, C, and K attached to reference numerals. Each of light sources 1Y to 1K is a semiconductor laser.

As shown in FIG. 1A, the light source 1Y emits an optical signal for writing a yellow component image. A divergent light beam emitted from the light source 1Y is converted to a light beam form suitable for the subsequent optical system by a coupling lens 3Y. The light beam converted by the coupling lens 3Y can be parallel rays of light, or a light beam with a lower convergence or a light beam with a lower divergence. In this specification, the light beam will be explained as a parallel rays of light.

The coupled light beam is converged in the sub-scanning direction by a cylindrical lens 5Y, is formed as a line image elongated in the main scanning direction at the deflective reflection surface of the polygon mirror 7, and is deflected equiangularly by the equiangular rotation of the polygon mirror 7.

Likewise, a light beam from the light source 1M, which emits an optical signal for writing a magenta component, is coupled by a coupling lens 3M, is formed as a line image elongated in the main scanning direction at the deflective reflection surface of the polygon mirror 7 due to the action of a cylindrical lens 5M, and is deflected equiangularly by the equiangular rotation of the polygon mirror 7.

A light beam from the light source 1C, which emits an optical signal for writing a cyan component, is coupled by a coupling lens 3C, is formed as a line image elongated in the main scanning direction at the deflective reflection surface of the polygon mirror 7 due to the action of a cylindrical lens 5C, and is deflected equiangularly by the equiangular rotation of the polygon mirror 7.

A light beam from the light source 1K, which emits an optical signal for writing a black component, is coupled by a coupling lens 3K, is formed as a line image elongated in the main scanning direction at the deflective reflection surface of the polygon mirror 7 due to the action of a cylindrical lens 5K, and is deflected equiangularly by the equiangular rotation of the polygon mirror 7.

The incident positions of the light beam from the light source 1Y, and the light beam from the light source 1M to the polygon mirror 7 are shifted in the rotation axis direction (the sub-scanning direction) of the polygon mirror 7, and the incident positions of the light beam from the light source 1C, and the light beam from the light source 1K to the polygon mirror 7 are shifted in the rotation axis direction of the polygon mirror 7. The optical path from the light source 1Y to the polygon mirror 7, and the optical path from the light source 1M to the polygon mirror 7 can be set so as to overlap each other in a direction orthogonal to the sheet of FIG. 1A (the sub-scanning direction). Likewise, the optical path from the light source 1C to the polygon mirror 7, and the optical path from the light source 1K to the polygon mirror 7 can be set so as to overlap each other in the sub-scanning direction.

FIG. 1B depicts the optical path running from the polygon mirror to the scanning target surface.

As shown in FIG. 1B, the polygon mirror 7 has two deflection portions defined by the deflective reflection surfaces, which are separated from one another in an axial direction. Those portions designated by reference numerals 7A and 7B are the two deflection portions. The deflection portion 7A has a predetermined number of deflective reflection surfaces, and deflects the light beams from the light sources 1M and 1C. The deflection portion 7B has the same structure as the deflection portion 7A, and deflects the light beams from the light sources 1Y and 1K.

The light beam from the light source 1Y deflected by the deflection portion 7B has its optical path bent by mirrors MY1, MY2, MY3, is guided to the drum-like photoconductor 11Y that actually serves as the scanning target surface, and forms a light beam spot on the photoconductor 11Y by the actions of scanning lenses 91Y and 92Y disposed on the optical path.

The light beam from the light source 1K deflected by the deflection portion 7B has its optical path bent by mirrors MK1, MK2, MK3, is guided to the drum-like photoconductor 11K that actually serves as the scanning target surface, and forms a light beam spot on the photoconductor 11K by the actions of scanning lenses 91K and 92K disposed on the optical path.

The light beam from the light source 1M deflected by the deflection portion 7B has its optical path bent by mirrors MM1, MM2, MM3, is guided to the drum-like photoconductor 11M that actually serves as the scanning target surface, and forms a light beam spot on the photoconductor 11M by the actions of scanning lenses 91M and 92M disposed on the optical path.

The light beam from the light source 1C deflected by the deflection portion 7B has its optical path bent by mirrors MC1, MC2, MC3, is guided to the drum-like photoconductor 11C that actually serves as the scanning target surface, and forms a light beam spot on the photoconductor 11C by the actions of scanning lenses 91C and 92C disposed on the optical path.

The scanning lens 91Y (91M, 91C, 91K), and the scanning lens 92Y (92M, 92C, 92K) constitute the scanning optical system that converges each deflected light beam on the corresponding photoconductor 11Y, 1M, 1C, 11K as a light beam spot.

Each photoconductor is charged by a charger (not shown), electrostatic latent images formed through optical scanning are made visible with toners of the colors corresponding to the electrostatic latent images on the corresponding photoconductors by a developing unit (not shown), and the resultant toner images are transferred, one on another on a recording sheet (not shown), forming a color image. The color image formed on the recording sheet this way is fixed by a fixing unit (not shown), and is then discharged out of the image forming apparatus.

FIG. 2 depicts the polygon mirror as viewed from a rotation axis direction.

The deflection portions 7A and 7B of the polygon mirror 7 have the same shape, and the deflective reflection surface has a right hexagonal shape in a plan view as indicated by solid lines when the polygon mirror 7 is stationary. When each deflection portion rotates at a high speed, each deflective reflection surface is deformed by the action of the centrifugal force. The deflective reflection surface can be deformed into a convex form as indicated by reference numeral 71, or can be deformed into a concave form as indicated by reference numeral 72.

Whether the deflective reflection surface that is approximately flat in a stationary state is deformed into a convex form or a concave form when being rotated depends on the diameter and the shape of the center portion of the polygon mirror 7, the material for the polygon mirror 7, and the number of rotations of the polygon mirror 7. If the parameters of the polygon mirror 7, such as the shape, the size, and the number of rotations, are specified, however, the deformation state of the deflective reflection surface is also specified.

In the embodiment shown in FIG. 1, the deflective reflection surface of the polygon mirror 7 is deformed into a convex form as indicated by reference numeral 71 in FIG. 2. In this case, the deflective reflection surface of the polygon mirror 7 becomes a convex cylindrical face with the bus line being the sub-scanning direction, and serves as an optical element having negative power in the main scanning direction with respect to the deflected light beam.

When such deformation occurs, therefore, the light beam waist of the deflected light beam in the main scanning direction is shifted from the position before deformation in a direction away from the polygon mirror. To correct the shifting of the light beam waist position, the distance between the light source and the coupling lens is set slightly larger, so that the light beam output from the coupling lens has slightly greater convergence than a parallel light beam.

Regarding the sub-scanning direction, when the deflective reflection surface has a convex shape, the positional relationship between a line image elongated in the main scanning direction and the deflective reflection surface is shifted, and the amount of the shift changes the light beam waist position in the sub-scanning direction due to the vertical magnification. If the distance between the light source and the coupling lens is set slightly longer, and the light beam output from the coupling lens is made to have slightly greater convergence than a parallel light beam, the deviation of the line image elongated in the main scanning direction from the deflective reflection surface becomes smaller. Therefore, correcting the positional relationship between the coupling lens and the light source can reduce the positional deviation of the light beam waist in the sub-scanning direction. With regard to the sub-scanning direction, fluctuation of the light beam waist position can be reduced further by correcting the positional relationship between the coupling lens and the light source in the aforementioned manner, and the position of the cylindrical lens 5Y, for example, is adjusted in the optical axis direction.

In the embodiment shown in FIG. 1, there is another case that the deflective reflection surface of the polygon mirror 7 is deformed into a concave form as indicted by reference numeral 72 in FIG. 2. In this case, the deflective reflection surface of the polygon mirror 7 becomes a concave cylindrical face with the bus line being the sub-scanning direction, and serves as an optical element having positive power in the main scanning direction with respect to the deflected light beam.

When such deformation occurs, therefore, the light beam waist of the deflected light beam in the main scanning direction is shifted from the position before deformation in a direction toward the polygon mirror. To correct the shifting of the light beam waist position, the distance between the light source and the coupling lens is set slightly shorter, so that the light beam output from the coupling lens has slightly greater divergence than a parallel light beam.

Regarding the sub-scanning direction, when the deflective reflection surface has a concave shape, the positional relationship between a line image elongated in the main scanning direction and the deflective reflection surface is shifted, and the amount of the shift changes the light beam waist position in the sub-scanning direction due to the vertical magnification. If the distance between the light source and the coupling lens is set slightly shorter, and the light beam output from the coupling lens is made to have slightly greater divergence than a parallel light beam, the deviation of the line image elongated in the main scanning direction from the deflective reflection surface becomes smaller. Therefore, correcting the positional relationship between the coupling lens and the light source can reduce the positional deviation of the light beam waist in the sub-scanning direction. With regard to the sub-scanning direction, fluctuation of the light beam waist position can be reduced further by correcting the positional relationship between the coupling lens and the light source in the aforementioned manner, and the position of the cylindrical lens 5Y, for example, is adjusted in the optical axis direction.

Figure 3:
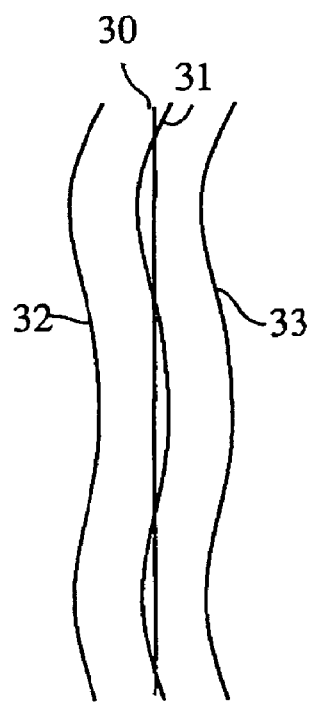
FIG. 3 depicts curving of an image surface in a main scanning direction, along with deformation of a polygon mirror.

FIG. 3 depicts curving of an image surface in the main scanning direction.

In FIG. 3, reference numeral 30 is a scanning target surface, and reference numeral 31 is curving of an image surface when there is no deformation caused by high-speed rotation of the polygon mirror. When the deflective reflection surface of the polygon mirror is deformed to a convex form, the light beam waist position in the main scanning direction is shifted in the direction away from the polygon mirror (rightward in FIG. 3) as mentioned above, and the curving of the image surface in the main scanning direction becomes as indicated by reference numeral 33. If the distance between the coupling lens and the light source is set slightly longer so that the coupled light beam has a low convergence, however, the light beam waist position in the main scanning direction can be made closer to the position of the polygon mirror, causing the curving of the image surface in the main scanning direction to approach the intended curving 31 of the image surface.

When the deflective reflection surface of the polygon mirror is deformed to a concave form, the light beam waist position in the main scanning direction is shifted in the direction toward the polygon mirror (leftward in FIG. 3), and the curving of the image surface in the main scanning direction becomes as indicated by reference numeral 32. If the distance between the coupling lens and the light source is set slightly shorter so that the coupled light beam has a low divergence, however, the light beam waist position in the main scanning direction can be set apart from the position of the polygon mirror, causing the curving of the image surface in the main scanning direction to approach the intended curving 31 of the image surface.

The adjustment of the positional relationship between the coupling lens and the light source, and the positional adjustment of the cylindrical lens can be done by actually rotating the polygon mirror 7 when the optical scanning apparatus is assembled.

In the embodiment shown in FIG. 1, the polygon mirror 7 has the two deflection portions 7A and 7B separated from each other in the rotation axis direction. The amount of deformation of the deflective reflection surface by the high-speed rotation (the maximum amounts of deviation of the concave shape or the convex shape originating from the deformation, and the flat deflective reflection surface in a stationary state in the direction orthogonal to the rotation axis) in this case has been simulated. The simulation result shows that the amount of deformation at a high-speed rotation is not the same for the deflection portions 7A and 7B, and there is a slight difference between both amounts.

In this case, as the amount of adjustment of the distance between the light source and the coupling lens (or further the amount of the positional adjustment of the coupling lens in the optical axis direction) is adjusted according to the average amount of deformation of the deflective reflection surface of the deflection portion 7A, 7B, adjustment of the positional relationships of each light source and the corresponding coupling lenses or the like can be carried out commonly. Setting the amount of adjustment of the distance between the light source and the coupling lens according to the amount of deformation of each deflection portion is effective when higher definition with optical scanning is intended.

In the embodiment, the polygon mirror 7 has the deflection portions 7A and 7B that are formed integral with each other and are separated from each other in the rotation axis direction. However, the polygon having a plurality of deflection portions in the rotation axis direction is not limited to this structure, and can have a plurality of different polygon mirrors integrally placed one on another in the rotation axis direction.

In the optical scanning apparatus according to the embodiment of the invention, a light beam emitted from the light source 1Y (1M, 1C, 1K) is converted into a desired light beam form by the coupling lens 3Y (3M, 3C, 3K), after which the converted light beam is formed as a line image elongated in the main scanning direction by the line-image forming optical system 5Y (5M, 5C, 5K), the line image is deflected by the high-speed rotation of the polygon mirror 7 that has a deflective reflection surface near an image-forming position of the line image, and the deflected light beam is converged as a light beam spot onto the scanning target surface of the photoconductor 11Y (1M, 1C, 11K) by the scanning optical system 91Y (91M, 91C, 91K), 92Y (92M, 92C, 92K) to optically scan the scanning target surface with the light beam spot, wherein that optical system that is closer to the light source than the polygon mirror 7 is set so as to correct a change in the image-forming position of the light beam spot caused by deformation of the deflective reflection surface originating from the high-speed rotation of the polygon mirror.

In the optical scanning apparatus, setting the optical system located closer to the light source than the polygon mirror 7 is carried out by adjusting at least the positional relationship between the light source 1Y (1M, 1C, 1K) and the coupling lens 3Y (3M, 3C, 3K), the position of a light beam waist in any one of the main scanning direction and the sub-scanning direction of a light beam to be converged onto the scanning target surface or both is closer to the scanning target surface when the polygon mirror rotates at a high speed than when the polygon mirror does not rotate. The optical scanning apparatus includes two or more light sources 1Y to 1K for optically scanning two or more scanning target surfaces of the photoconductors 11Y to 11K different from one another, wherein optical scanning is performed on the two or more scanning target surfaces of the photoconductors 11Y to 11K simultaneously, light beams from the two or more light sources are deflected by the polygon mirror common thereto, and that optical system that is closer to each light source than the common polygon mirror 7 is set so as to correct a change in the image-forming position of the light beam spot caused by deformation of the deflective reflection surface originating from the high-speed rotation of the polygon mirror.

Light beams for optically scanning at least two different scanning target surfaces of the photoconductors 11Y, 11M (11C, 11K) are input to different positions of the common polygon mirror 7 in a rotation axis direction of the polygon mirror, and deflected, and the common polygon mirror 7 has two deflection portions 7A and 7B defined by the deflective reflection surface that are separated from one another in the axial direction.

The optical system on each light source side, which emits a light beam to be deflected by each deflection portion 7A, 7B of the common polygon mirror 7 from that deflection portion of the common polygon mirror 7, can be set according to the average amount of deformation of the deflective reflection surface of each deflection portion 7A, 7B originating from the high-speed rotation of the common polygon mirror 7, or the optical system on each light source side, which emits a light beam to be deflected by each deflection portion 7A, 7B of the common polygon mirror 7 from that deflection portion of the common polygon mirror, can be set according to the amount of deformation of the deflective reflection surface of each deflection portion originating from the high-speed rotation of the common polygon mirror.

There are four scanning target surfaces of the photoconductors 11Y to 11K to be optically scanned simultaneously, and images of color components for forming a combined color image are written respectively on the scanning target surfaces.

The image forming apparatus according to the embodiment exposes one or more photoconductors 11Y to 11K to form an image by optical scanning, and uses the optical scanning apparatus described above as an optical scanning apparatus, the photoconductors 11Y to 11K that perform exposure by optical scanning are of a photoconductive type, and electrostatic latent images formed by optical scanning are made visible as toner images. Four drum-like or belt-like photoconductors 11Y to 11K are laid out with rotation axis in parallel to one another, the optical scanning apparatus is one described above, and electrostatic latent images formed on the respective photoconductors are made visible by four different toners for forming a color image, obtained toner images that are transferred one on another on a same recording sheet, and are fixed, thereby forming a color image.

As described above, according to the optical scanning apparatus of the present embodiment, an adequate light beam spot of a small diameter can be formed on the scanning target surface, regardless of whether the shape of the deflective reflection surface is concave or convex, or regardless of the amount of deformation. This makes it unnecessary to design the scanning optical system according to the deformed shape and the amount of deformation of the deflective reflection surface. Therefore, the image forming apparatus according to the present invention can perform favorable image forming using the optical scanning apparatus of the invention.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning apparatus comprising:
a light source that emits a light beam;
a coupling optical system that receives the light beam from the light source and converts the light beam into a specific form;
a line-image forming optical system that receives the light beam from the coupling optical system and forms a line image elongated in a main scanning direction;
a polygon mirror that rotates, wherein the polygon mirror receives the light beam from the line-image forming optical system and deflects the light beam, the polygon mirror including a deflective reflection surface near an image-forming position at which the line image is formed; and
a scanning optical system that receives the light beam from the polygon mirror and converges the light beam as a light beam spot onto a target surface to be scanned, and optically scans the target surface with the light beam spot, wherein
at least one of the optical systems closer to the light source than the polygon mirror is configured so as to correct a change in an image-forming position of the light beam spot caused by deformation of the deflective reflection surface originating from the rotation of the polygon mirror.

2. The optical scanning apparatus according to claim 1, wherein at least a positional relationship between the light source and the coupling optical system is adjusted.

3. The optical scanning apparatus according to claim 1 or 2, wherein a position of a light beam waist in any one of the main scanning direction and a sub-scanning direction or both of a light beam to be converged onto the target surface is closer to the target surface when the polygon mirror rotates than when the polygon mirror does not rotate.

4. The optical scanning apparatus according to any one of claims 1 to 3, including a plurality of light sources that emits light beams for optically scanning a plurality of target surfaces different from one another, wherein
optical scanning is performed on the plurality of target surfaces simultaneously,
the light beams from the plurality of light sources are deflected by the polygon mirror, and
the optical system that is closer to each light source than the polygon mirror is configured so as to correct a change in the image-forming position of the light beam spot caused by deformation of the deflective reflection surface originating from the rotation of the polygon mirror.

5. The optical scanning apparatus according to claim 4, wherein the light beams for optically scanning the plurality of different target surfaces are input to different positions of the polygon mirror in a rotation axis direction of the polygon mirror, and deflected by the polygon mirror.

6. The optical scanning apparatus according to claim 5, wherein the polygon mirror includes a plurality of deflection portions defined by the deflective reflection surface that are separated from one another in an axial direction.

7. The optical scanning apparatus according to claim 6, wherein the optical system on a side of each light source that emits a light beam to be deflected by each deflection portion is configured according to an average amount of deformation of the deflective reflection surface of each deflection portion originating from the rotation of the polygon mirror.

8. The optical scanning apparatus according to claim 6, wherein the optical system on a side of each light source that emits a light beam to be deflected by each deflection portion is configured according to an amount of deformation of the deflective reflection surface of each deflection portion originating from the rotation of the polygon mirror.

9. The optical scanning apparatus according to any one of claims 5 to 8, including three or four target surfaces to be optically scanned simultaneously, wherein images of color components for forming a combined color image are written respectively on the target surfaces.

10. An image forming apparatus comprising an optical scanning apparatus according to any one of claims 1 to 9 that performs exposure by optical scanning on one or more photoconductors to form an image.

11. The image forming apparatus according to claim 10, wherein
the photoconductor onto which the exposure by optical scanning is performed is photoconductive,
an electrostatic latent image is formed on the photoconductor by the exposure by optical scanning, and
the electrostatic latent image is made visible into a toner image.

12. The image forming apparatus according to claim 11, wherein
three or four of any one of drum-like and belt-like photoconductors are laid out with a rotation axis in parallel to one another,
the optical scanning apparatus according to claim 9 is employed, and
electrostatic latent images formed on the respective photoconductors are made visible into toner images by three or four different toners, the toner images are transferred one on another on a recording sheet, and are fixed, thereby forming a color image.

13. The optical scanning apparatus according to claim 1, wherein
the polygon mirror rotates at speed of 20,000 rotations per minute or more.

* * * * *